United States Patent
Le Pifre

(10) Patent No.: US 8,824,568 B2
(45) Date of Patent: Sep. 2, 2014

(54) DEVICE AND METHOD FOR DECODING DIGITAL TV BROADCAST

(75) Inventor: Pierre Roger Bernard Le Pifre, Hermanville sur Mer (FR)

(73) Assignee: Entropic Communications, Inc., San Diego, CA (US)

( * ) Notice: Subject to any disclaimer, the term of this patent is extended or adjusted under 35 U.S.C. 154(b) by 486 days.

(21) Appl. No.: 12/863,408

(22) PCT Filed: Jan. 26, 2009

(86) PCT No.: PCT/IB2009/050304
§ 371 (c)(1),
(2), (4) Date: Jul. 16, 2010

(87) PCT Pub. No.: WO2009/095839
PCT Pub. Date: Aug. 6, 2009

(65) Prior Publication Data
US 2010/0321568 A1    Dec. 23, 2010

(30) Foreign Application Priority Data
Jan. 28, 2008    (EP) .................................... 08290070

(51) Int. Cl.
*H04B 1/66*    (2006.01)
*H04N 7/00*    (2011.01)

(52) U.S. Cl.
USPC ..................... 375/240.28; 348/462

(58) Field of Classification Search
USPC .......... 348/462, 464, 465, 466; 704/500, 229; 375/240.01, 240.16, 240.25, 240.26, 375/240.28
See application file for complete search history.

(56) References Cited

U.S. PATENT DOCUMENTS

| | | | | |
|---|---|---|---|---|
| 4,882,754 A | * | 11/1989 | Weaver et al. | 704/201 |
| 5,873,022 A | * | 2/1999 | Huizer et al. | 725/100 |
| 2003/0067872 A1 | * | 4/2003 | Harrell et al. | 370/229 |
| 2004/0255063 A1 | * | 12/2004 | Crinon et al. | 710/55 |
| 2005/0033857 A1 | * | 2/2005 | Imiya | 709/232 |
| 2006/0184697 A1 | * | 8/2006 | Virdi et al. | 709/248 |

FOREIGN PATENT DOCUMENTS

| | | |
|---|---|---|
| EP | 1 691 514 A1 | 8/2006 |
| WO | 2003 058869 A2 | 7/2003 |
| WO | 2004 045197 A2 | 5/2004 |

OTHER PUBLICATIONS

Chen, "Transporting Compressed Digital Video," Section 4.1: "Video Synchronization Techniques"; Mar. 31, 2002; Kluwer academic Publishers; XP002534500; p. 102, paragraph 5.

* cited by examiner

*Primary Examiner* — Behrooz Senfi
(74) *Attorney, Agent, or Firm* — Richard Bachand; Duane Morris LLP

(57) ABSTRACT

For use as or in connection with a set-top box, a digital TV broadcast signal is decoded by processing its audio stream into and read from a FIFO buffer. According to certain embodiments, fullness of the FIFO buffer is compared to a reference fullness, which can be updated based on changes to the bit rate of the audio stream. In response to the FIFO buffer fullness, the set top box regulates the rate at which the audio stream is decoded. The disclosed decoding methods do not need to rely on the accuracy or presence of a system time encoded into the broadcast signal.

12 Claims, 3 Drawing Sheets

DEVICE AND METHOD FOR DECODING DIGITAL TV BROADCAST

FIELD OF THE INVENTION

The present invention relates generally to decoding digital TV broadcasts, and in particular to using a set-top box to decode a digital TV signal without reference to a system clock.

BACKGROUND OF THE INVENTION

TV transmission is becoming less analog and more digital. To support digital broadcasting, set-top boxes (STB) are needed to decode the received broadcast stream so the signal can be shown on the display. Motion Picture Engineering Group (MPEG) standards specify that digital TV (DTV) transmissions are clocked using a time reference embedded in the digital stream. This time reference is used by the STB to synchronize the STB local clock on the system clock. This method is called the program clock reference (PCR) method. Alternatively, MPEG standards allow clock synchronization by using the video buffering information encoded into the stream, referred to as the video buffer verifier (VBV) method.

The ability to display a DTV broadcast without degradations such as video freeze, blocks, audio cuts, and so forth, can be an important distinguishing characteristic in the marketplace. In particular, the ability of the STB to decode non-compliant streams can impact a customer's buy-decision, particularly in countries where the broadcast conditions do not accurately follow DTV standards. In the PCR method, if the system clock reference is not correctly encoded in the stream, or is not correctly decoded by the STB, then the synchronization between the DTV broadcast and the STB can be lost, resulting in the STB local clock being faster or slower than the system time. The main consequence is that the DTV bit stream will not be decoded by the STB at the same speed it has been broadcasted by the system. Under these conditions, the STB's internal buffer will eventually either run out of data or overflow, leading to artifacts like video freeze, macro block display, and audio cuts. The VBV method can be unreliable as an alternative because very often the VBV data is not present in the DTV stream.

SUMMARY OF THE INVENTION

Various aspects of the present invention are directed to methods and arrangements for implementing processor power state transitions in a manner that addresses and overcomes the above-mentioned issues.

Consistent with an example embodiment, the present invention is directed to methods for use in a set-top box that receives a digital TV broadcast having an audio stream with a coded bit rate, and that processes a representation of the audio stream through a first-in-first-out (FIFO) buffer. The methods include extracting the audio stream into a FIFO buffer and comparing an indication of FIFO fullness to a reference FIFO fullness. In response to the FIFO fullness, the methods provide for regulating a rate at which a representation of the audio stream is processed from the FIFO. The methods further include identifying changes in the audio stream bit rate, and in response thereto, updating the reference FIFO fullness.

Consistent with an example embodiment, the present invention is further directed to methods of synchronizing the local clock of a set-top box to the system time embedded in a digital TV broadcast. The methods include determining bit rate information for an audio stream extracted from the broadcast signal both into and out of a FIFO buffer, providing an indication of FIFO buffer fullness, adjusting the local clock using the bit rate information and the indication of FIFO buffer fullness, and decoding the extracted audio stream using the adjusted local clock.

Consistent with an example embodiment, the present invention is further directed to a set-top box that receives a digital TV broadcast having an audio signal with a coded bit rate and that processes a representation of the audio signal through a first-in-first-out (FIFO) buffer.

The set-top box includes a data-decoding circuit to decode and extract the bit rate from the audio signal, a circuit for providing an indication of FIFO fullness based on an indication of bytes written to the FIFO buffer, an indication of bytes read from the FIFO buffer, and FIFO buffer size, and a rate-adjustment circuit to compare the indication of FIFO fullness to a reference FIFO fullness and, in response thereto, regulate a rate at which a representation of the audio signal is processed from the FIFO.

Consistent with an example embodiment, the present invention is further directed to a device for decoding a received digital TV broadcast signal. The device includes a de-multiplexer configured to extract an audio stream from the received broadcast signal, an audio decoder configured for decoding the audio stream using a local clock, a FIFO buffer positioned such that the de-multiplexer writes audio stream data to the buffer and the audio decoder reads audio stream data from the buffer, and a correction circuit configured to develop a correction for the local clock based on fullness of the buffer and bit rate information for the extracted audio stream.

BRIEF DESCRIPTION OF THE DRAWINGS

The invention may be more completely understood in consideration of the following detailed description of various embodiments of the invention in connection with the accompanying drawings, in which.

Figure 1:
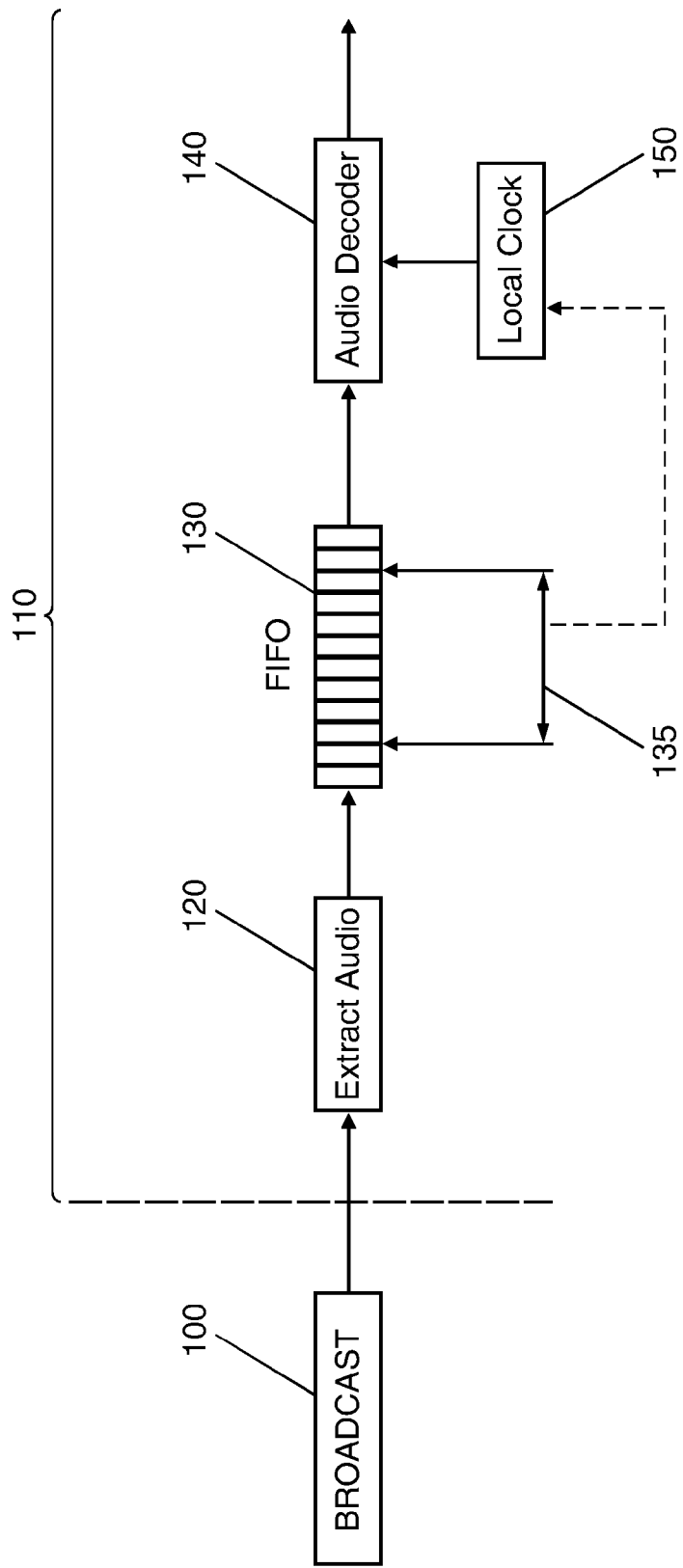
FIG. 1 illustrates the use of a set-top box to extract and decode a broadcast stream in accordance with the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the invention including aspects defined by the appended claims.

DETAILED DESCRIPTION OF THE EMBODIMENTS

The present invention provides devices and methods to decode a DTV broadcast signal without having to rely on encoded system clock information such as used in the PCR method and without having to rely on encoded video buffer information such as used in the VBV method. The present invention is not necessarily limited to these types of DTV standards.

Certain embodiments of the present invention take advantage of the fact that the data content multiplexed in the broadcast stream has a constant average bit rate, and that this bit rate value is encoded into the stream. When the local time and the system time are different, variations in the buffer fullness can be observed. Using the bit rate information as a reference, these buffer fullness variations can be converted into frequency adjustments for a local clock, thus alleviating the need for previous methods such as the PCR method.

In accordance with one aspect of the present invention, indirect timing information from the DTV bit stream content is used to regulate the data consumption from the input buffer; this can occur even if the clock reference information normally encoded into the broadcast is inaccurate or non-existent. The indirect timing information can be computed from the audio stream, and includes bit rate information and buffer fullness information.

FIG. 1 shows a DTV 100 broadcast being received by STB 110. At the STB 110, the various elementary streams can be extracted from the broadcast, including the video stream (not indicated) and the audio stream, for example using a de-multiplexer 120. The extracted audio stream is written to a first-in-first-out (FIFO) buffer 130, and is in turn read from the FIFO buffer by the audio decoder 140, which decodes the stream into pulse code modulation (PCM) samples. The audio decoding process is regulated by the STB local clock 150. As used in this document, the term FIFO buffer refers to a first-in first-out memory buffer, whether implemented in memory locations that are physically contiguous or virtually linked, for first-in first-out processing. The present invention can regulate the rate of decoding using an indication of FIFO fullness 135, as indicated by the dashed arrow.

Figure 2:
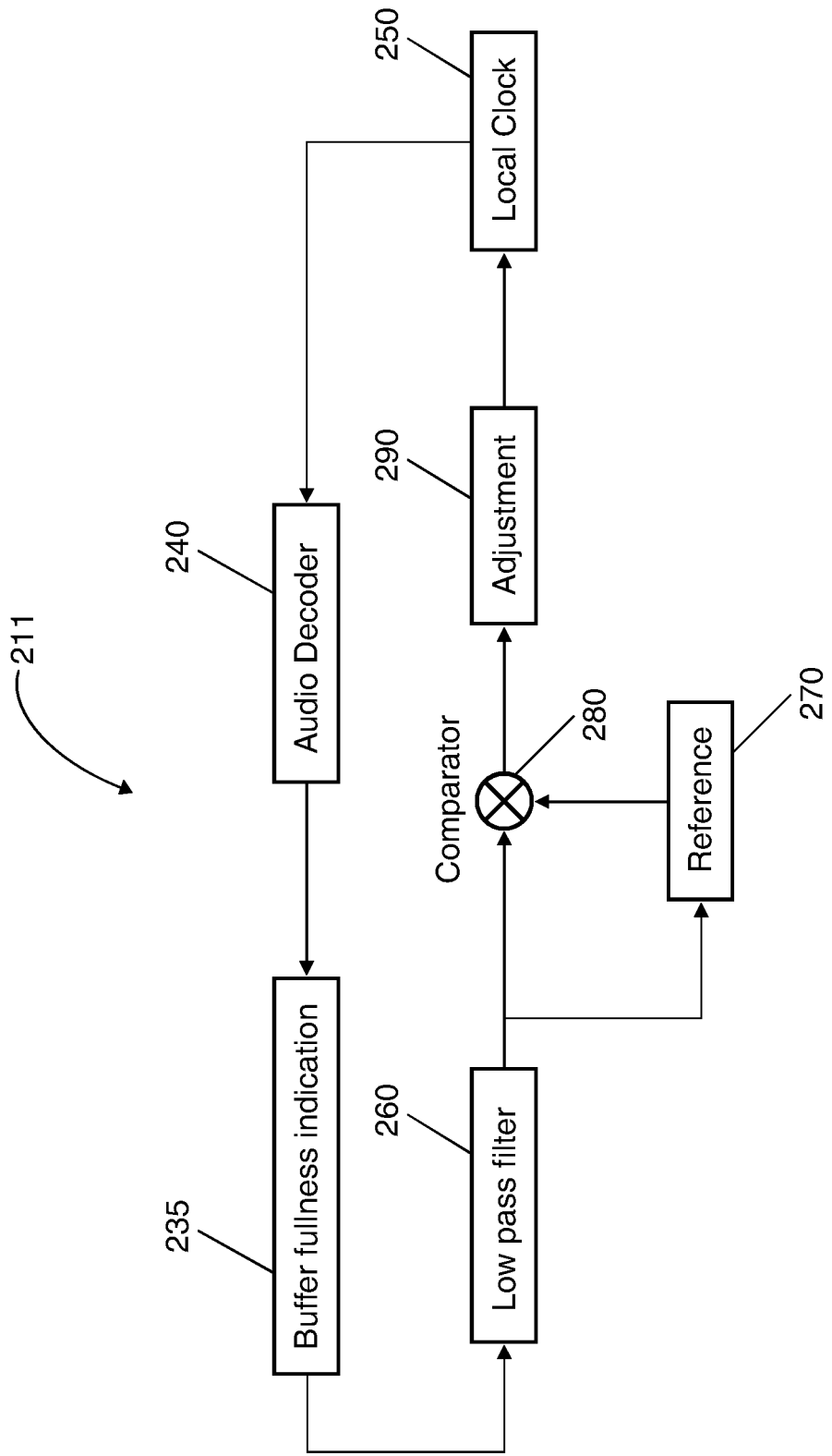
FIG. 2 illustrates a circuit for regulating the decoding of an audio signal using a buffer fullness indication and bit rate reference in accordance with an embodiment of the present invention.

FIG. 2 shows a decoding process 211 using decoding rate adjustment in accordance with the present invention. Once the audio decoding process has started, the FIFO buffer fullness 235 can be measured. The FIFO fullness samples 235 can be passed through a low pass filter 260 to remove any inaccuracy in the reading, for example due to the fact that the audio decoder continues to read data out of the FIFO buffer while the de-multiplexer continues to write new data, and possibly at the same time. The first reading of the filtered FIFO buffer fullness is used as a reference 270 to initialize a comparator 280. The fullness reference 270 can be changed in response to changes in the audio bit rate. The average bit rate for the audio stream is coded into, and can be read from, the audio frame header. The exact location of the bit rate information depends on the audio standard used (e.g., MPEG or Dolby Digital), but it is always present.

Once the FIFO fullness reference 270 has been initialized (or updated in response to changes in the bit rate), each new filtered FIFO fullness measurement is compared to the reference, producing a buffer fullness error. The buffer fullness error can be used to feed a control filter 290 that adjusts the local clock 250. The clock output is accordingly adjusted, thus changing the rate at which the audio decoder 240 decodes, in turn resulting in a modification to the FIFO buffer fullness.

Figure 3:
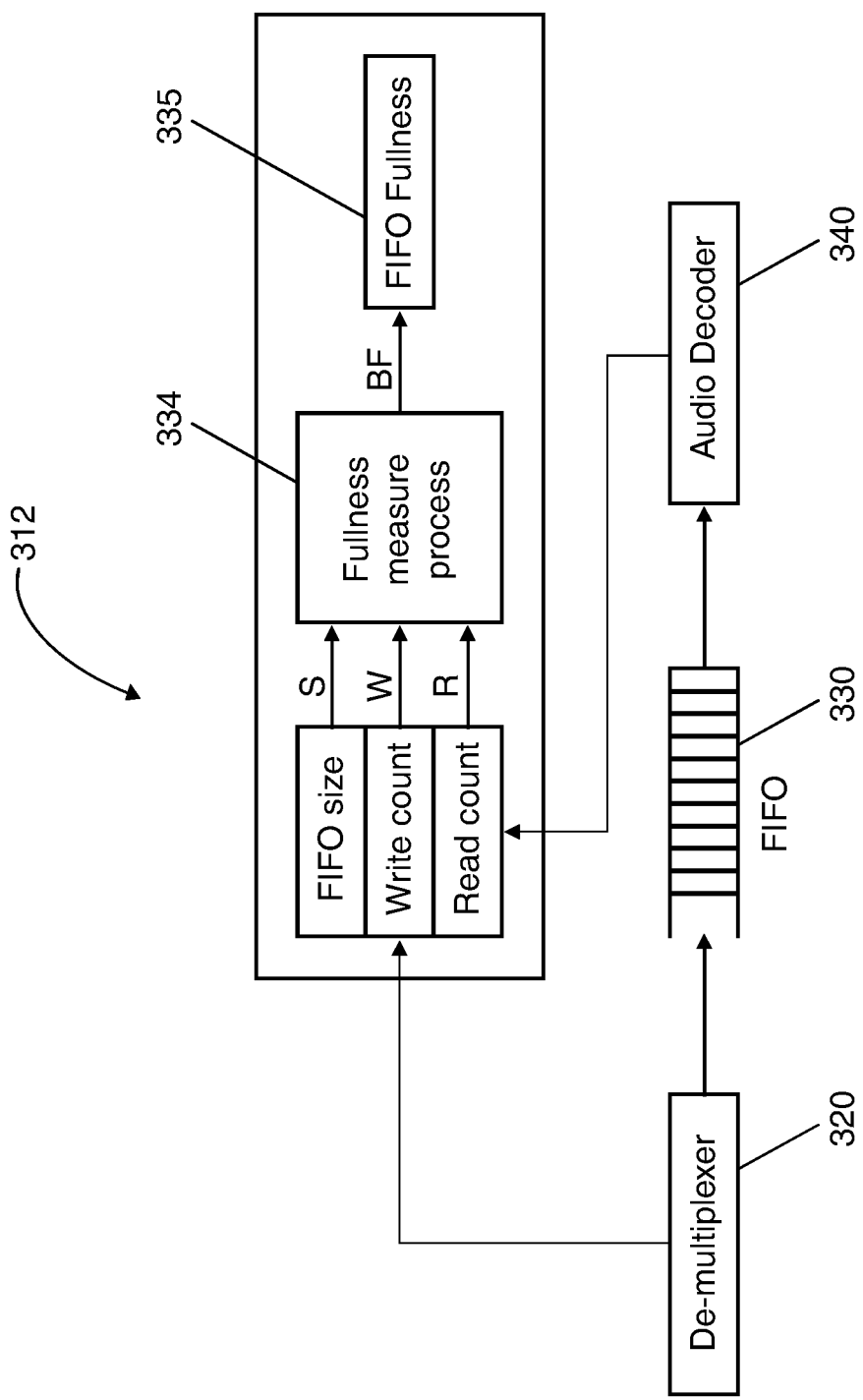
FIG. 3 illustrates a circuit for determining buffer fullness in accordance with an embodiment of the present invention.

FIFO buffer fullness can be measured in any suitable manner. In some embodiments, it may be convenient to measure the buffer fullness using the fullness circuit 312 illustrated by FIG. 3. In reference to FIG. 3, each time the de-multiplexer 320 (for example) writes samples to the FIFO buffer 330, the number of bytes written can be added to the content of a FIFO write pointer W. Each time the audio decoder 340 reads samples from the FIFO buffer, the number of bytes read can be subtracted from the content of a FIFO read pointer R. Upon each FIFO read or write operation, the fullness measurement 334 is triggered, and the buffer fullness BF is computed according to the following rules:

if $(W>=R)$, then $BF=W-R$; and if $(W<R)$, then $BF=S-(R-W)$, where S is the FIFO buffer size (i.e., capacity). The indication of FIFO fullness 335 can then be used as described above.

The present invention recognizes advantages to using the audio input buffer to determine whether and how to adjust the local clock. The fullness trajectory of the audio input buffer is relatively easy to predict and filter such that changes to the buffer fullness tend to be incremental in nature. Because of this, there is no need to set fullness thresholds. In addition, the bit rate of the audio stream is relatively low (e.g., maximum bit rate of 640 Kbits per second), and so monitoring the buffer fullness consumes very little CPU power.

The various embodiments described above and shown in the figures are provided by way of illustration only and should not be construed to limit the invention. Based on the above discussion and illustrations, those skilled in the art will readily recognize that various modifications and changes may be made to the present invention without strictly following the exemplary embodiments and applications illustrated and described herein. For instance, one or more of the above example embodiments may be implemented with a variety of approaches, including digital and/or analog circuitry and/or software-based approaches. The above example embodiments and implementations may also be integrated with a variety of circuits, devices, systems and approaches. Such modifications and changes do not depart from the true scope of the present invention that is set forth in the following claims.

The invention claimed is:

1. For use in a set-top box (STB) that receives a digital TV broadcast having an audio stream with a coded bit rate, and that processes a representation of the audio stream through a first-in-first-out (FIFO) buffer, a method performed in the STB, comprising:
   comparing an indication of FIFO fullness to a reference FIFO fullness, the reference FIFO fullness being based on the coded bit rate, and in response thereto, adjusting a local clock frequency to regulate a rate at which a representation of the audio stream of the original TV broadcast is processed from the FIFO; and
   identifying changes in the coded bit rate, and in response thereto, updating the reference FIFO fullness.

2. The method of claim 1, wherein the indication of FIFO fullness is a measurement based on the number of bytes written into the FIFO buffer, the number of bytes read from the FIFO buffer, and the FIFO buffer size.

3. The method of claim 1, wherein the indication of FIFO fullness is an estimation based on an initial FIFO fullness, a determined bit rate into the FIFO buffer, and a determined bit rate out of the FIFO buffer.

4. The method of claim 1, wherein the bit rate is an average bit rate.

5. The method of claim 1, further including initializing the reference FIFO fullness.

6. The method of claim 1, wherein the method is performed upon an indication that a system time encoded into the broadcast does not match the local clock time at the set-top box.

7. The method of claim 1, further comprising decoding the audio stream using the local clock of the set-top box.

8. The method of claim 1, wherein regulating the rate at which a representation of the audio stream is processed from the FIFO comprises correcting a local clock that regulates the rate.

9. A set-top box that receives a digital TV broadcast having an audio signal with a coded bit rate and that processes a representation of the audio signal through a first-in-first-out (FIFO) buffer, the set-top box comprising:
 a data-decoding circuit to decode and extract the bit rate from the digital TV broadcast's audio signal;
 a circuit for providing an indication of FIFO fullness based on an indication of bytes written to the FIFO buffer, an indication of bytes read from the FIFO buffer, and FIFO buffer size; and
 a rate-adjustment circuit to compare the indication of FIFO fullness to a reference FIFO fullness, the reference FIFO fullness being based on the extracted bit rate, and, in response thereto, adjusting a local clock frequency to regulate a rate at which a representation of the audio signal is processed from the FIFO, the rate-adjustment circuit also serving to update the reference FIFO fullness in response to changes in the extracted bit rate.

10. A device for decoding a received digital TV broadcast signal, the device comprising:
 a de-multiplexer configured to extract an audio stream from the received digital TV broadcast signal;
 an audio decoder configured for decoding the audio stream using a local clock;
 a first-in-first-out (FIFO) buffer to which the de-multiplexer writes audio stream data and from which the audio decoder reads audio stream data;
 a correction circuit configured to develop a correction for the local clock based on a comparison of a fullness reference of the FIFO buffer developed from bit rate information in the extracted audio stream and a FIFO fullness; and
 a circuit to update the fullness reference in response to changes in the bit rate information.

11. The device of claim 10, wherein FIFO fullness is a measurement based on the number of bytes written into the FIFO buffer, the number of bytes read from the FIFO buffer, and the FIFO buffer size.

12. The device of claim 10, wherein FIFO fullness is an estimation based on an initial FIFO fullness, a determined bit rate into the FIFO buffer, and a determined bit rate out of the FIFO buffer.

* * * * *